(12) United States Patent
Anderson et al.

(10) Patent No.: US 7,370,978 B2
(45) Date of Patent: May 13, 2008

(54) ENCRYPTING DATA

(76) Inventors: Daryl E. Anderson, 1000 NE. Circle Blvd., Corvallis, OR (US) 97330;
Andrew L. Van Brocklin, 1000 NE. Circle Blvd., Corvallis, OR (US) 97330;
Peter James Fricke, 1000 NE. Circle Blvd., Corvallis, OR (US) 97330;
Timothy D. Emmerich, 1000 NE. Circle Blvd., Corvallis, OR (US) 97330

( * ) Notice: Subject to any disclaimer, the term of this patent is extended or adjusted under 35 U.S.C. 154(b) by 355 days.

(21) Appl. No.: 11/125,008

(22) Filed: May 9, 2005

(65) Prior Publication Data
US 2006/0250585 A1 Nov. 9, 2006

(51) Int. Cl.
*G03B 21/14* (2006.01)

(52) U.S. Cl. .................. 353/79; 353/122; 713/189

(58) Field of Classification Search ............... 353/79, 353/122, 8; 713/182, 189
See application file for complete search history.

(56) References Cited

U.S. PATENT DOCUMENTS

| | | | |
|---|---|---|---|
| 5,924,013 A | 7/1999 | Guido et al. | |
| 6,141,530 A | 10/2000 | Rabowsky | |
| 6,167,514 A | 12/2000 | Matsui et al. | |
| 6,811,267 B1 | 11/2004 | Allen et al. | |
| 7,019,900 B2 * | 3/2006 | Benning et al. | 359/459 |
| 7,206,940 B2 * | 4/2007 | Evans et al. | 713/193 |
| 2002/0038460 A1 | 3/2002 | Kimoto | |
| 2002/0095679 A1 | 7/2002 | Bonini | |
| 2002/0196198 A1 | 12/2002 | Yaniv | |
| 2003/0017846 A1 | 1/2003 | Estevez et al. | |
| 2003/0051139 A1 | 3/2003 | Kubota | |
| 2003/0115263 A1 | 6/2003 | Tran et al. | |
| 2003/0165240 A1* | 9/2003 | Bantz et al. | 380/54 |
| 2004/0039927 A1 | 2/2004 | Hazama et al. | |
| 2004/0158864 A1* | 8/2004 | Kakemura | 725/80 |
| 2004/0158873 A1 | 8/2004 | Pasqualino | |
| 2004/0222983 A1 | 11/2004 | Kakemura | |
| 2004/0236943 A1 | 11/2004 | Edwards et al. | |
| 2004/0267981 A1 | 12/2004 | Kakemura | |
| 2005/0005109 A1 | 1/2005 | Castaldi et al. | |
| 2005/0008156 A1 | 1/2005 | Pelly | |
| 2006/0026428 A1* | 2/2006 | Schrijen et al. | 713/171 |
| 2006/0177060 A1* | 8/2006 | Johnson et al. | 380/255 |
| 2006/0210080 A1* | 9/2006 | Tuyls et al. | 380/274 |
| 2007/0041092 A1* | 2/2007 | Fricke et al. | 359/443 |
| 2007/0052638 A1* | 3/2007 | May et al. | 345/84 |
| 2007/0057886 A1* | 3/2007 | Johnson et al. | 345/90 |
| 2007/0081130 A1* | 4/2007 | May et al. | 353/85 |
| 2007/0085977 A1* | 4/2007 | Fricke et al. | 353/79 |
| 2007/0097333 A1* | 5/2007 | Zavarehi et al. | 353/85 |
| 2007/0110226 A1* | 5/2007 | Ogata | 380/28 |

FOREIGN PATENT DOCUMENTS

JP 2003-69923 3/2003

* cited by examiner

Primary Examiner—William C. Dowling

(57) ABSTRACT

Embodiments disclose encrypting data used to adjust reflectivity of the screen.

39 Claims, 7 Drawing Sheets

ENCRYPTING DATA

BACKGROUND

Projection systems may be used to display still or video images. Some screens used in projection systems may receive a control signal as part of the process of displaying an image. Although one way to transmit such a control signal to a screen is via wireless (e.g., radio frequency) transmission, such transmission can create security issues. Specifically, the control signal can be intercepted by unscrupulous persons. Moreover, such transmission may cause problems as between projection systems. In particular, adjacent projection systems may suffer from crosstalk that interferes with proper control of the respective screens of the systems.

BRIEF DESCRIPTION OF THE DRAWINGS

The disclosed systems and methods can be better understood with reference to the following drawings. The components in the drawings may be depicted to scale.

DETAILED DESCRIPTION

Image contrast can be benefited by controlling the reflectivity of the screen relative to the images that are projected onto the screen, for example by transmitting a wireless control signal that includes data, such as control data, from the projector to the screen that indicates the manner in which the reflectivity of the screen should be adjusted. However, providing a control signal in this manner may result in a lack of security over the control data and crosstalk between adjacent projection systems. As is described in the following, however, security can be provided and crosstalk can be avoided by encrypting the control data that is transmitted from the projector to its associated screen. In order to decrypt the control data received from the projector, the screen uses an appropriate key, such as the encryption key used to encrypt the data. That key can be provided, or identified, to the screen using various methods including, for example, manual entry of a key code, downloading of a key or a key code from a portable storage device, optical transmission of a key or key code, or setting of switches provided on the projector and the screen so that the projector and the screen have the same key.

Figure 1:
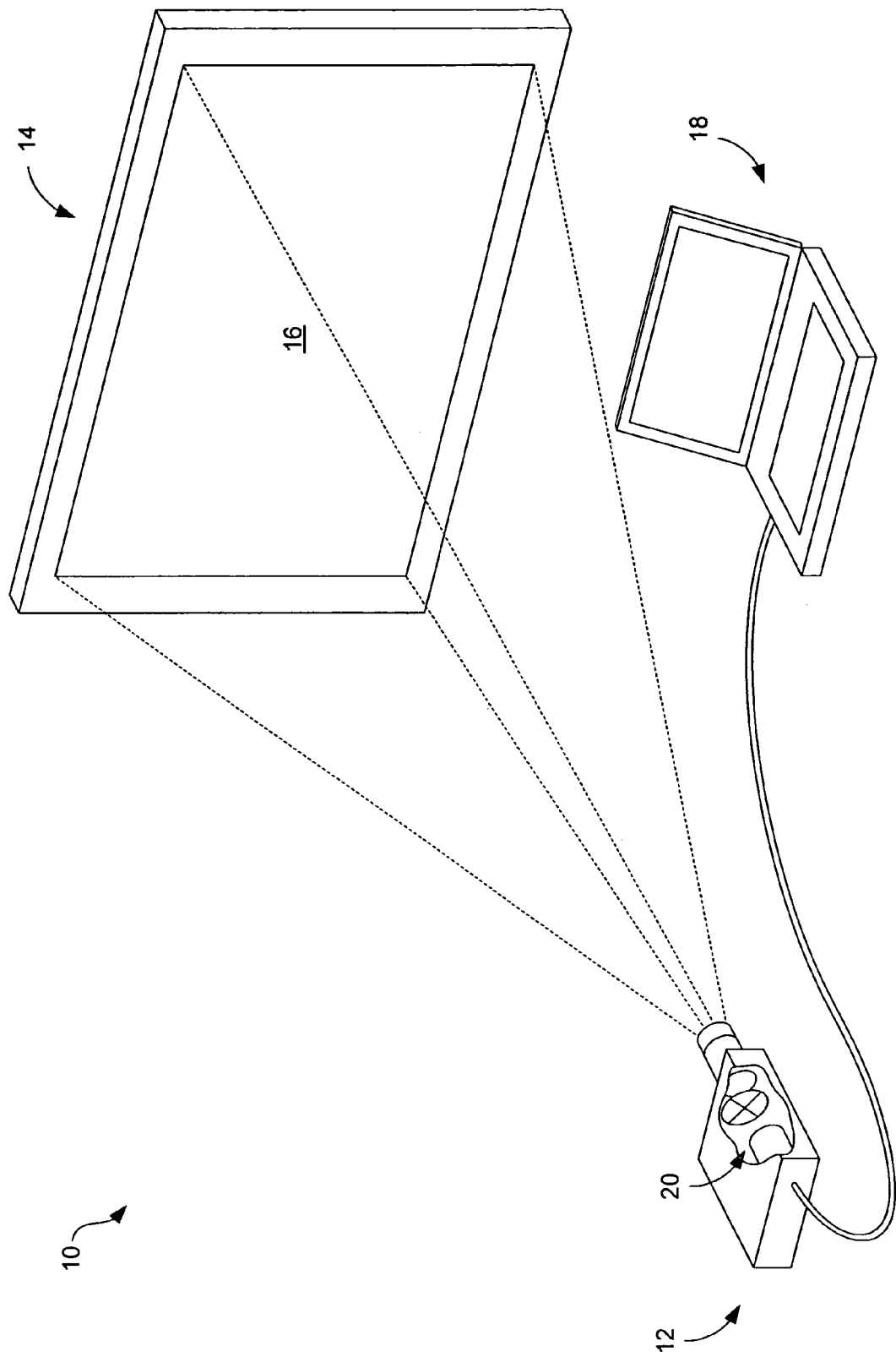
FIG. 1 is a perspective view of an embodiment of a display system.

Referring initially to FIG. 1, a display system according to an embodiment of the present disclosure is shown generally at 10. Specifically, FIG. 1 illustrates a display system 10 including a projector 12 and a variable-reflectivity display or projection screen 14, on which the projector can project an image 16. The projector 12 is associated with a source of image data, for example an associated processor, depicted in FIG. 1 as a laptop computer 18. The projector 12 therefore may be configured to project an image 16 onto the projection screen 14 that corresponds to image data received from the computer 18.

Although the projector 12 is depicted in FIG. 1 as a front projection system, other types of projection systems may be used, including rear projection devices. In a front projection system, as is shown in FIG. 1, the viewer typically is located on the same side of the screen 14 as the projector 12, and the projector is spaced apart and separate from the screen. In a rear projection system (not shown), the viewer typically is located on the opposite side of the screen 14 as the projector 12, and the projected image is viewed through an at least partially light transmissive screen.

The projector 12 may take the form of a digital projector, or any other suitable projection device. Regardless, the projector 12 typically includes a light engine 20 that is configured to direct and transmit light to the projection screen 14 to generate a projected image that corresponds to the image data received from the computer 18 or other source. For example, light engine 20 may be any suitable illumination component that is adapted to optically address the projection screen 14, including single white light sources (such as a mercury lamp, plasma lamp, incandescent lamp, etc.) and/or multiple white or single color light sources (such as light emitting diodes (LEDs), laser diodes, etc.). Additionally, the projector 12 may include optics, spatial light modulators, scanning mirrors, focusing devices, color-generation devices, controllers, etc. The images projected by the projector 12 may include still images or video images. Both still and video images will be referred to herein simply as projected images.

Figure 2:
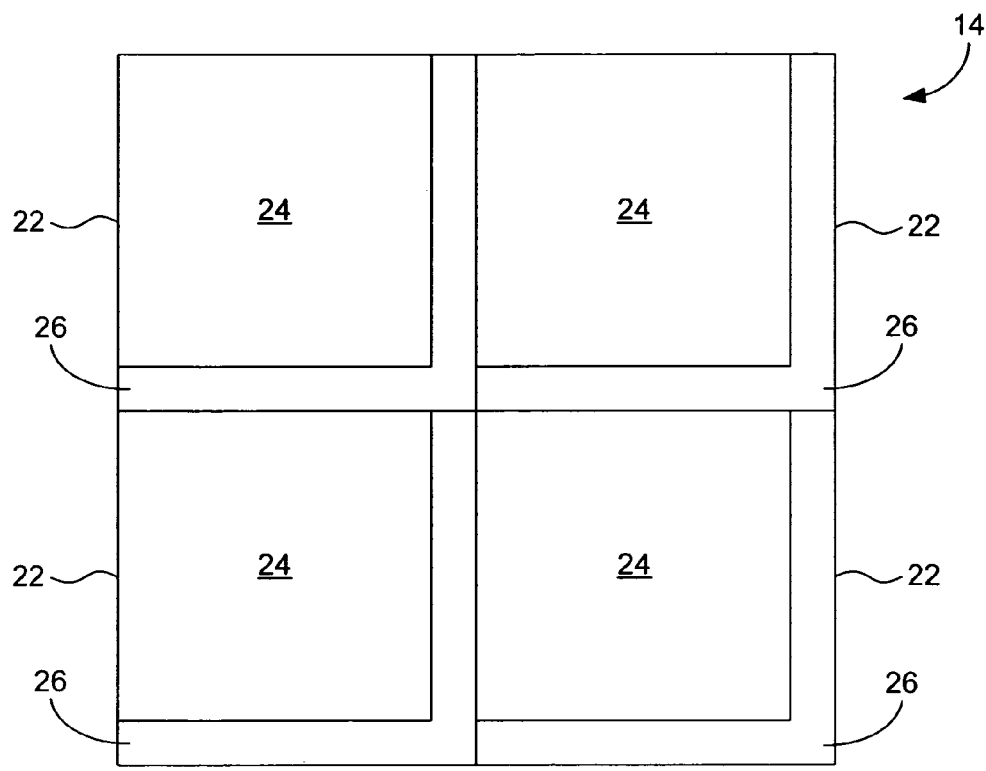
FIG. 2 is a partial view of an embodiment of a display surface of the embodiment of a projection screen shown in FIG. 1.

The projection screen 14 may incorporate a plurality of display elements, each display element including at least one active pixel element. One or more optical properties of each pixel element may be individually modified, so that the projection screen 14 may exhibit the desired variable reflectivity (or variable transmissivity in the case of rear projection). As is shown in FIG. 2, the front projection screen 14 can incorporate a plurality of display elements 22, each display element including at least one active pixel element 24. The reflectivity of each pixel element 24 may be individually modified. Each display element 22 may include a single pixel element, or a plurality of pixel elements, and may include a bias region 26. The bias region 26 may occupy a portion of the perimeter of the display element 22, may occupy one edge of the display element, or may be placed within the active pixel region of the display element. The reflectivity of the bias region 26 may be fixed at the time of projection screen manufacture, or may be adjusted to one or more constant values.

In some embodiments, the display elements 22 of the projection screen 14 may be small enough such that individual display elements are not individually detectable to a viewer of the projection screen 14. For example, where the projected image is selected to be one meter by one meter in size, the display elements 22 may be on the order of about one square millimeter (mm). Similarly, where the projected image is a two meter by two meter image, each display element 22 may be about four square millimeters (e.g., 2 mm×2 mm). The bias region 26, when present, may occupy, for example, about 5% of the area of the display element 22.

The reflectivity of each pixel element 24 may be adjusted between a state of higher reflectivity and a state of lower reflectivity by applying an appropriate voltage to the pixel element. By setting the reflectance state of a particular pixel element 24 to correspond with the brightness of the portion of the projected image incident upon that pixel element, the contrast of the projected image may be enhanced. It should be appreciated that regions of the projected image that have a high luminance value (i.e., that are brighter) may benefit from projection onto pixel elements exhibiting a high reflectance. Similarly, images of the projected image having lower luminance values (i.e. that are darker) may benefit from projection onto pixel elements exhibiting a lower reflectance state. As a result, the bright portions of the image may appear brighter, and the dark portions may appear darker, and the apparent contrast of the projected image may be thereby enhanced. The projection screen 14 described herein may therefore be used to enhance the contrast of an image projected thereon, by coordinating the reflectivity of the display surface with the content of the projected image.

The enhanced contrast of the projected image that may result from the use of a projection screen as described herein may enhance the perceived quality of the displayed image, for example in conditions of low ambient light. Alternatively, or in addition, the resulting enhanced contrast may functionally reduce the color specifications for the light engine. That is, coordination of the projected image with an enhanced projection screen may permit an otherwise lower powered and/or less intense light engine to yield a satisfactory projected image.

Figure 3:
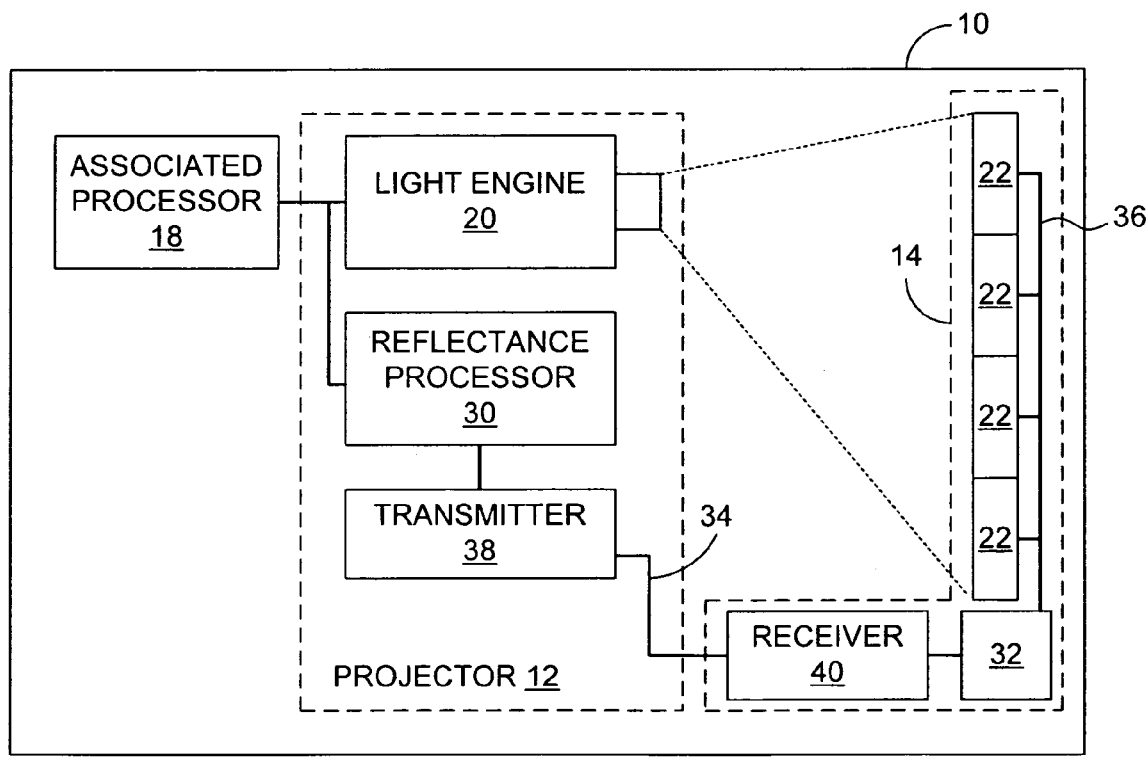
FIG. 3 is a block diagram of an embodiment of the display system of FIG. 1.

As is shown schematically in FIG. 3, display system 10 may include a display controller that is configured to alter the reflectivity of display surface 14 in coordination with the image displayed thereon, by selectively altering the reflectivity of individual display elements 22 to correspond with the content of the projected image incident upon that individual display element. Any device or mechanism capable of modulating the reflectivity of the display elements 22 in the display surface in order to achieve coordination with the projected image is a suitable display controller. The display controller may include one or more components including, for example, a reflectance processor 30 that is configured to convert the image data for the projected image into data such as reflectance data, or "control data," for the projection screen 14, and an electrode controller 32 that is configured to apply an appropriate voltage to the electrodes of the display elements 22, and more particularly to the pixel elements 24 (FIG. 2), in order to modify the reflectivity of that particular display element to match the reflectance state specified by the reflectance processor. The term "appropriate voltage," as used herein, denotes an applied potential having a polarity and magnitude sufficient to modify the reflectivity of the particular pixel element 24 in order to create the desired reflectance state in the pixel element 24.

In some embodiments, the reflectance processor 30 receives the same image data used by the light engine 20 to generate the projected image, and converts the image data into corresponding pixel element states. In various embodiments, the reflectance processor 30 may be incorporated within projector 12, as is shown in FIG. 3, or the reflectance processor may be incorporated in the associated processor 18 (e.g., laptop computer, FIG. 1).

In some embodiments, the image data for a full color image may be converted by the reflectance processor 30 into an approximately grayscale image by dithering the image using black and white pixels, where the black and white pixels may then be mapped to the high reflectance and low reflectance states of the pixel elements of the display surface. The resulting gray-scale image may then enhance the contrast of the image projected onto the display surface. In such a case, the control data transmitted to the projection screen 14 may comprise at least part of or a representation of the content of one or more images that are displayed on the screen.

Rather than simply mapping to a gray scale image, the conversion of the image data to control data may involve a more sophisticated data conversion. For example, reflectivity of the pixel elements 24 of the display surface may be selected so that the superposition of pixel element reflectivity and the content of the projected image combine to yield a desired quality of the resulting reflected light. The calculation of the appropriate control data by the reflectance processor 30 may be based in part on a non-linear combination of reflectivity and reflected color as may typically occur in a viewer's eye.

The control data is transmitted from the reflectance processor 30 of the projector 12 to the electrode controller 32 of the projection screen 14 along a data transmission path 34. Although the data transmission path 34 can comprise a cable that physically connects the projector 12 to the screen 14, the data transmission path 34 is may be a wireless "path" that is created using an appropriate transmission protocol, such as, for example, radio frequency (RF) and/or infrared (IR) transmission. In such a case, the projector 12 at least includes a wireless transmitter 38, and the screen 14 may at least include a wireless receiver 40. Because the control signal containing the control data can be intercepted, or crossed with other control data from a nearby display system, the control signal is encrypted, as is described in greater detail below.

The electrode controller 32 is responsive to the method of data transmission used by the reflectance processor 30, and may include at least an address system 36 for electrically addressing the individual display elements 22 in the display surface. The electrode controller 32 may be localized and interpret the control data for all or for a part of the display surface before addressing the electrodes of the projection screen. Alternatively, the electrode controller 32 may be delocalized, and include individual electrode controllers that may be associated with one or several display elements 22, so that each individual electrode controller may receive the control data for those display, and pixel, elements associated with that electrode controller, but not for other display and pixel elements not associated with that electrode controller.

Once a particular reflectance state of the display element 22 has been established, it may remain in that reflectance state until changed by the electrode controller. The reflectance may be "refreshed" by the electrode controller 32 (either directly or via optical addressing), or the electrode controller may be configured such that the reflectance state will not change until specifically altered by the electrode controller.

Adjustment of the reflectivity of the various display elements can be achieved in a variety of ways. In one method, two different reflectivity states may correspond to a distributed state and a condensed state of an electrophoretic cell. In another method, twisting-ball or twisting-cylinder displays that utilize particles that exhibit different colors in response to different applied electrical charges may be used.

Figure 4:
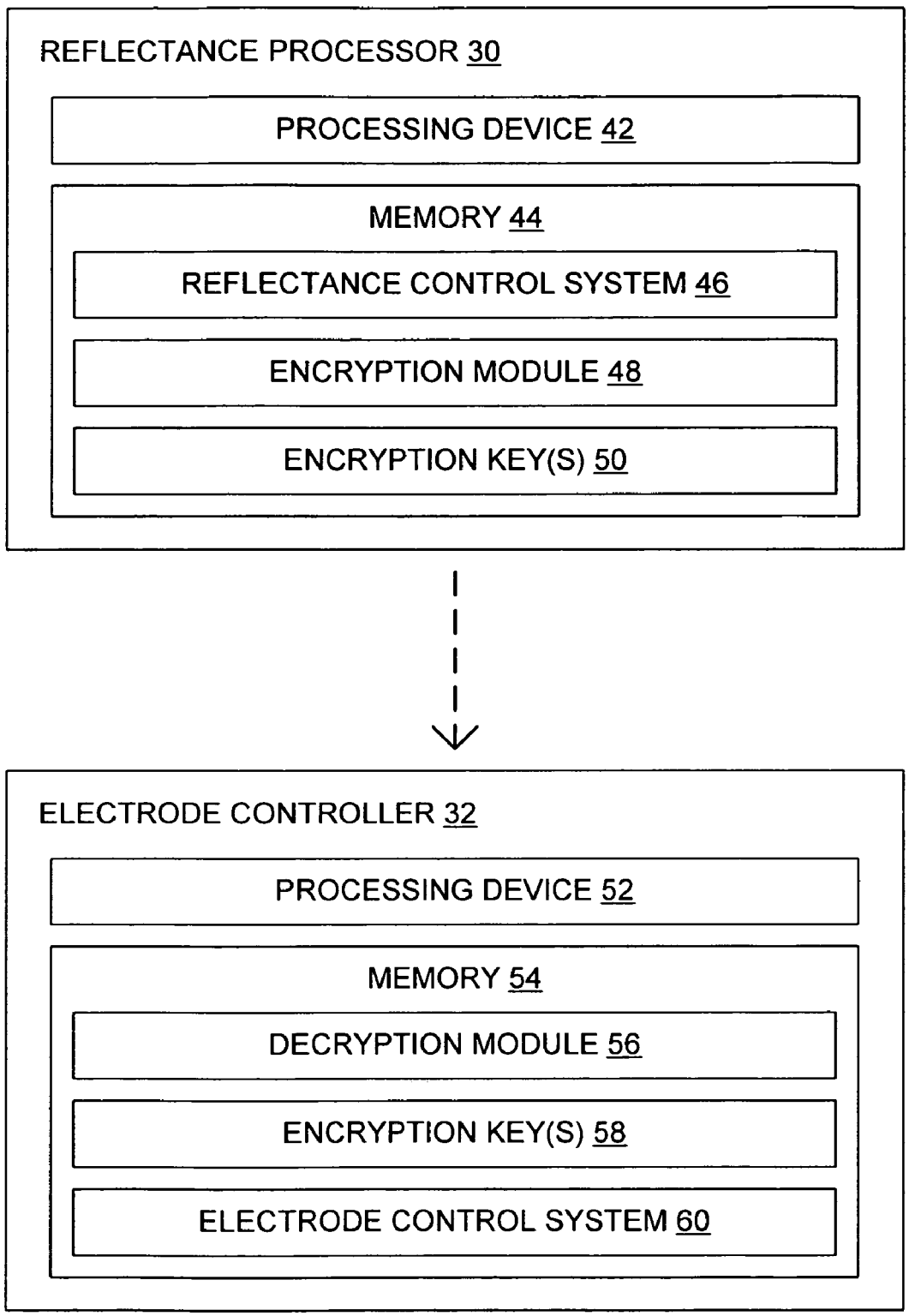
FIG. 4 is a block diagram of an embodiment of a reflectance processor and an embodiment of an electrode controller shown in FIG. 3.

FIG. 4 illustrates details of the reflectance processor 30 of the projector 12 and the electrode controller 32 of the projection screen 14. As is indicated in FIG. 4, the reflectance processor 30 includes a processing device 42, such as a microprocessor or appropriate application-specific integrated circuit (ASIC), that generates the control data that is to be provided to the electrode controller 32. The processing device 42 accomplishes this by executing a reflectance control system 46 that is stored in memory 44 of the reflectance processor. That memory 44 can comprise volatile (e.g., random-access memory (RAM)) and nonvolatile (e.g., hard disk, flash memory) memory elements. Also stored in memory 44 is an encryption module 48 that is used to encrypt the control data before it is transmitted to the electrode controller 32. Such encryption is achieved with an encryption key 50 that is likewise stored in memory 44. In some embodiments, the reflectance processor 30 comprises multiple encryption keys 50, which may be employed on a random basis. By way of example, the encryption keys comprise wired equivalent privacy (WEP) keys, or other appropriate keys, such as a public key/private key pair. In this embodiment, when the control data is encrypted with a given encryption key 50, the electrode controller 32 can use that same key to decrypt the control data.

As is further depicted in FIG. 4, the electrode controller 32 also comprises a processing device 52 and memory 54. Stored in memory 54 is a decryption module 56 that is configured to decrypt the control data that is received from the reflectance processor 30. The memory 54 further includes one or more encryption keys 58, and an electrode control system 60 that is used to control the electrodes of the projection screen 14 to thereby control the reflectivity of the display elements of the screen.

It is noted that the logic systems and modules described above can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

An example system having been described above, example methods for displaying image data will now be described. In the discussions that follow, flow diagrams are provided. Process steps or blocks in these flow diagrams may represent modules, segments, or portions of code that include one or more executable instructions for implementing specific logical functions or steps in the process. Although particular example process steps are described, alternative implementations are feasible. For instance, some steps may be executed out of order from that shown and discussed depending on the functionality involved.

Figure 5:
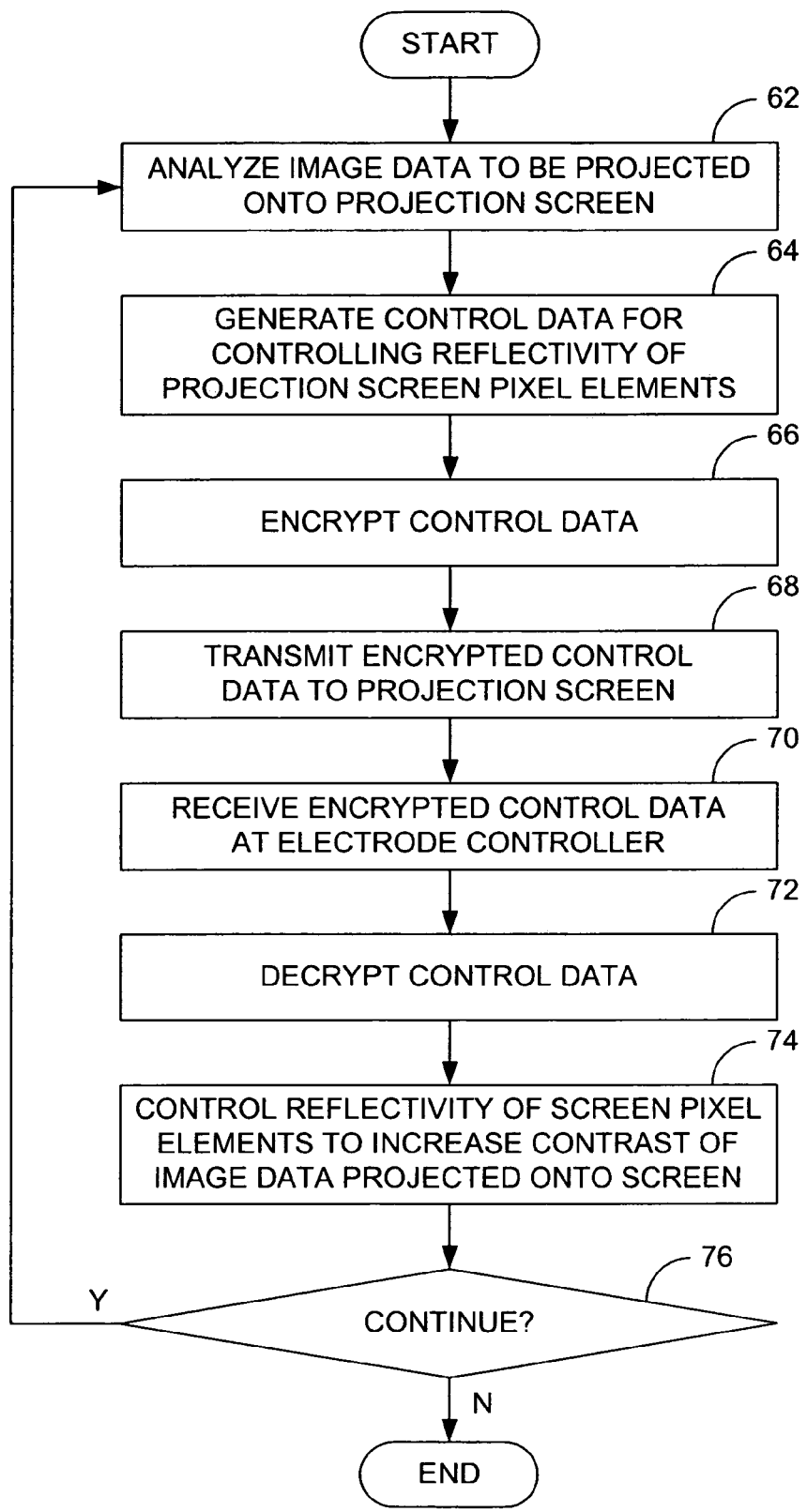
FIG. 5 is a flow diagram of a first embodiment of a method for displaying image data.

FIG. 5 illustrates an example method for displaying image data. More particularly, illustrated is an example method for encrypting and decrypting control data, which may comprise at least a portion of or a representation of image data to be displayed on a projection screen that is transmitted from a projector to the projection screen. Beginning with block 62, the reflectance processor 30 of the projector 12 analyzes the image data that is to be projected onto the projection screen 14. As is described above, this analysis is possible given that the image data that is provided to the light engine 20 is also provided to the reflectance processor 30. This image data may be provided to the reflectance processor 30 prior to the light engine 20, or at least before the light engine projects the image data, to provide enough time for the analysis and subsequent transmission of control data to be completed by the reflectance processor.

Once the image data is analyzed, the reflectance processor 30 generates control data for controlling the reflectivity of the projection screen pixel elements, as indicated in block 64. In particular, the reflectance processor 30 generates control data that will control the pixel elements such that regions of the projected image that have high luminance will be incident on pixel elements exhibiting high reflectance, and regions of the projected image that have lower luminance will be incident on pixel elements exhibiting lower reflectance.

Referring next to block 66, the reflectance processor 30 encrypts the control data. As is described above, this encryption provides security for the control data, which may comprise at least a portion of or a representation of the image data to be projected, in case the control signals transmitted from the projector 12 to the projection screen 14 are intercepted. In addition, encryption reduces the likelihood that crosstalk will adversely affect the display of images on the display system 10, or another display system that is proximate enough to receive the control signals. The control data is encrypted using the encryption module 48 and an encryption key 50.

After the control data is encrypted, the data can be transmitted to the projection screen 14, as indicated in block 68. As is described above, this transmission can comprise, for example, a wireless transmission facilitated by the transmitter 38 (FIG. 2). In such a case, the transmission is received by the receiver 40 of the projection screen 14 and, therefore, is received by the electrode controller 32, as indicated in block 70. Once the encrypted control data is received by the electrode controller 32, the controller can then decrypt the control data, as indicated in block 72, using the decryption module 56 and the same encryption key 50 that was used by the reflectance processor 30 to encrypt the data.

At this point, the decrypted control data can be used by the electrode controller 32 to control the reflectivity of the screen pixel elements to increase the contrast of the image data that is projected onto the projection screen 14, as indicated in block 74. Referring to decision block 76, flow returns to block 62 and continues for all image data projected onto the projection screen 14, and ultimately terminates once the viewing session has ended.

Figure 6:
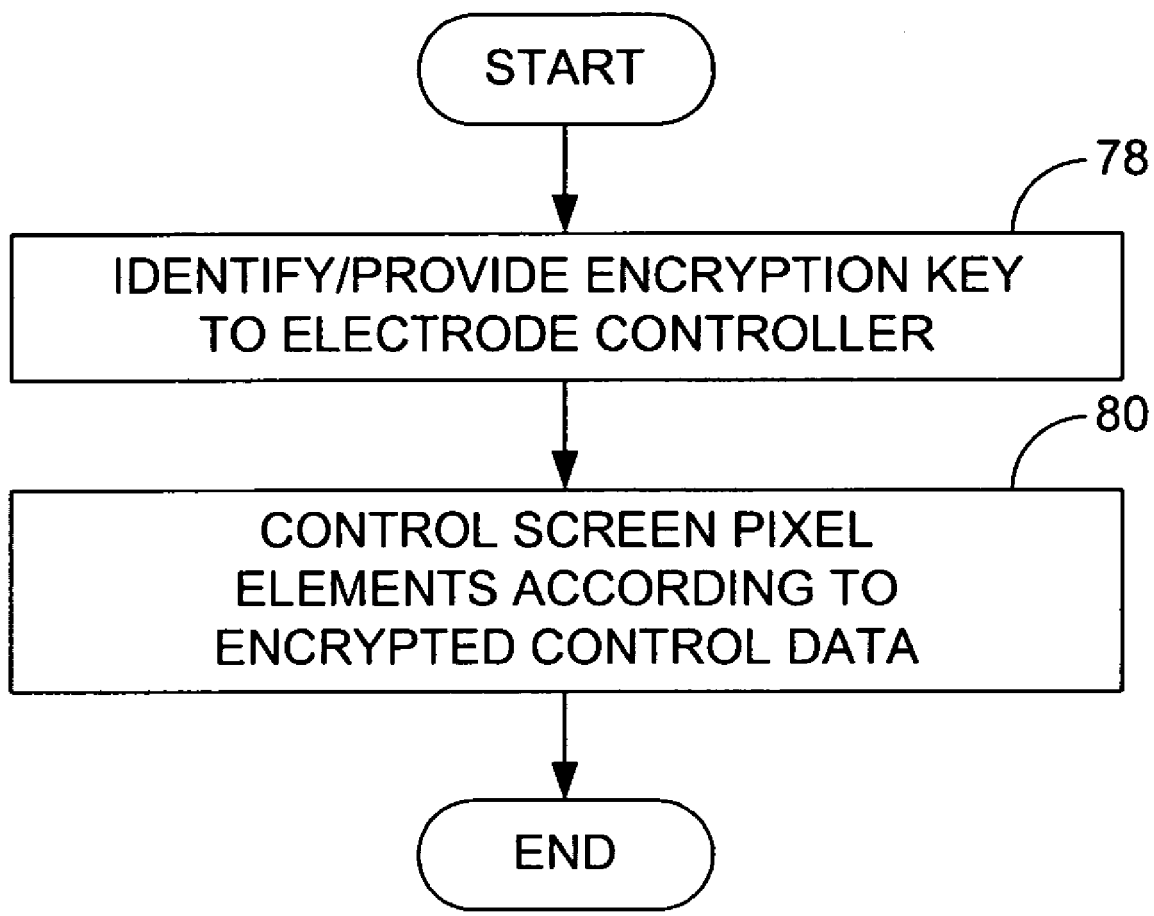
FIG. 6 is a flow diagram of a second embodiment of a method for displaying image data.

As can be appreciated from the above description, the key used by the reflectance processor to encrypt the control data will be available to the electrode controller 32 to decrypt the control data so that it may be used to control the reflectivity of the screen pixel elements. The flow described above in relation to FIG. 5 may therefore include identifying or providing the encryption key to the electrode controller 32. In such a case, displaying image data may be described as provided in FIG. 6 in which the encryption key is identified or provided to the electrode controller 32 (block 78), and the screen pixel elements are controlled according to the encrypted control data (block 80). Notably, the encryption key can be static, in which case the same encryption key is used to encrypt and decrypt for each viewing session. Alternatively, a different encryption key can be used for each viewing session, or can even be changed one or more times during a given viewing session. The encryption key can be identified or provided to the electrode controller 32 in various ways in any such case. FIGS. 7A-7D identify various example methods for identifying or providing the encryption key to the electrode controller 32.

Figure 7A:
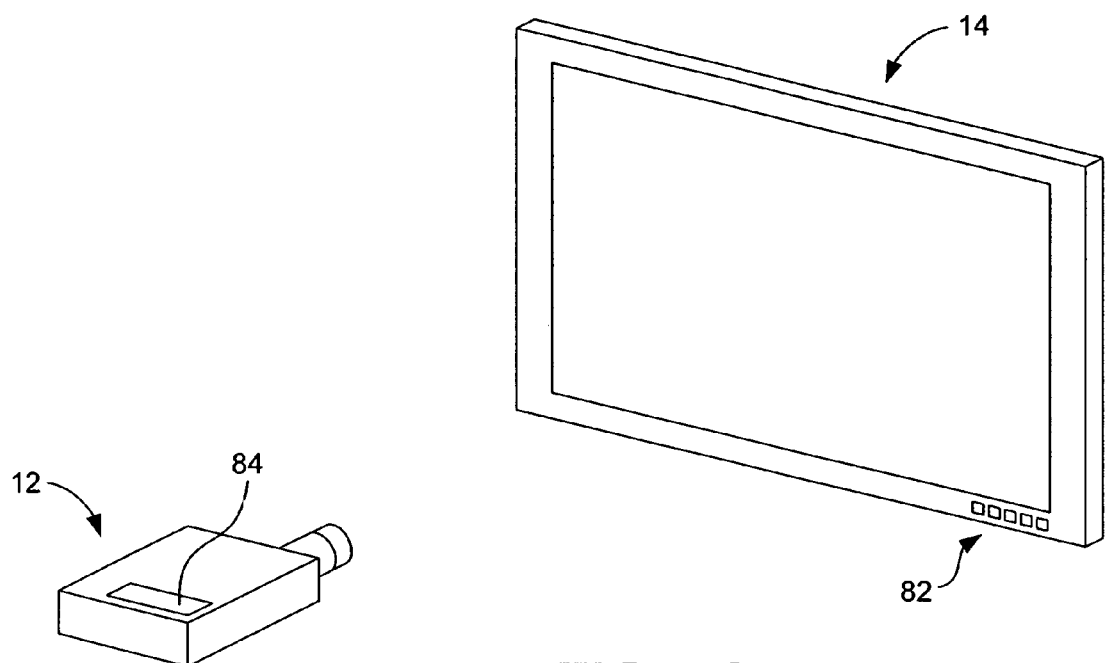
FIG. 7A is schematic representation of a first embodiment of a method for identifying or providing an encryption key to an embodiment of a projection screen.

Referring first to FIG. 7A, the encryption key can be manually entered into the projection screen 14 using one or more buttons or keys 82 provided on the projection screen. In such an embodiment, the projector 12 can identify the encryption key that is being used, for all viewing sessions or for the current viewing session, to the user who then manually enters a code that identifies the encryption key into the projection screen 14 using the buttons or keys 82. By way of example, the code can be provided to the user with a display 84, such as a liquid crystal display (LCD), of the projector 12. Alternatively, the code can be provided to the user with an audio signal that is generated with a speaker (not shown) provided on the projector 12. In either case, the code can be entered into the projection screen 14, and used to identify the appropriate encryption key. In some embodiments, the encryption key is determined from the code using a lookup table that is stored within memory of the projection screen (e.g., memory 54, FIG. 4). By way of example, the code can be provided to the user and entered into the projection screen 14 at the beginning of the viewing session.

Figure 7B:
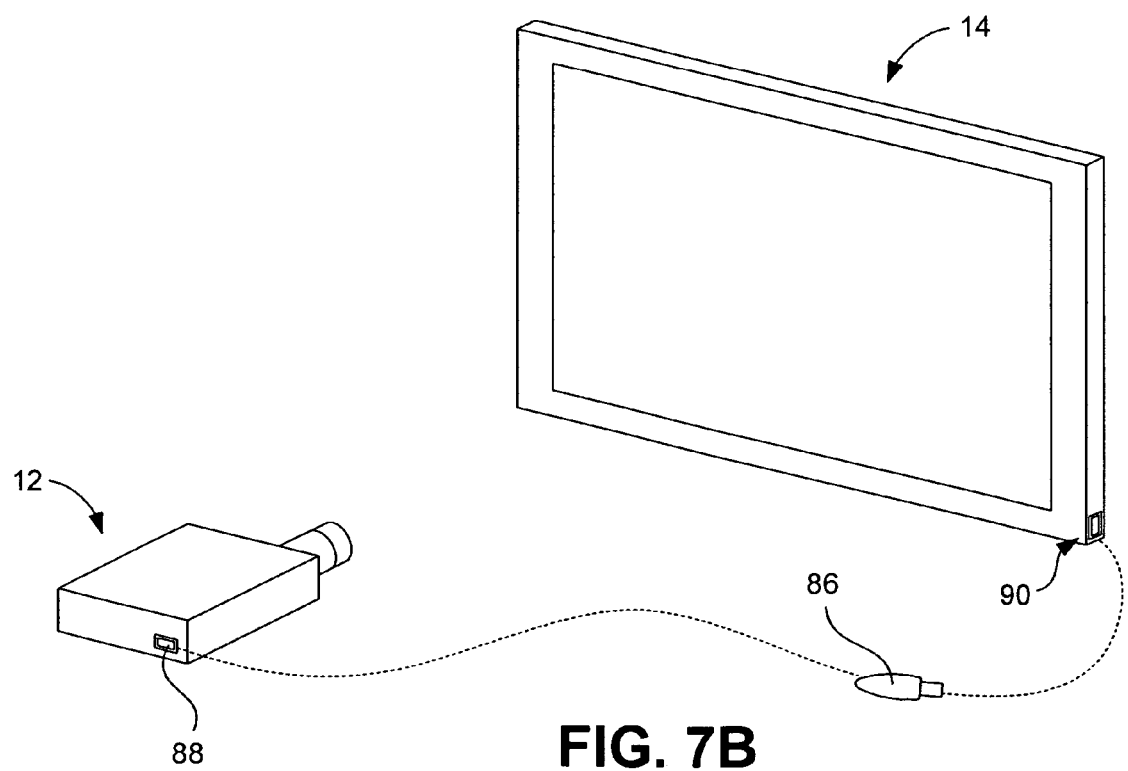
FIG. 7B is schematic representation of a second embodiment of a method for identifying or providing an encryption key to an embodiment of a projection screen.

Referring next to FIG. 7B, the encryption key can be identified or provided to the projection screen 14 using a portable storage device 86, such as a flash memory device (e.g., flash drive). In such a case, a code that identifies the encryption key or the key itself is first uploaded to the portable storage device 86 by inserting the device into a port 88 provided on the projector 12, and then is removed and inserted into a port 90 of the projection screen 14 for downloading. Again, if a code is provided to the projection screen 14, and therefore the electrode controller 32, the code can be used to look up the encryption code that will be used by the reflectance processor 30 of the projector 12 to encrypt the control data.

Figure 7C:
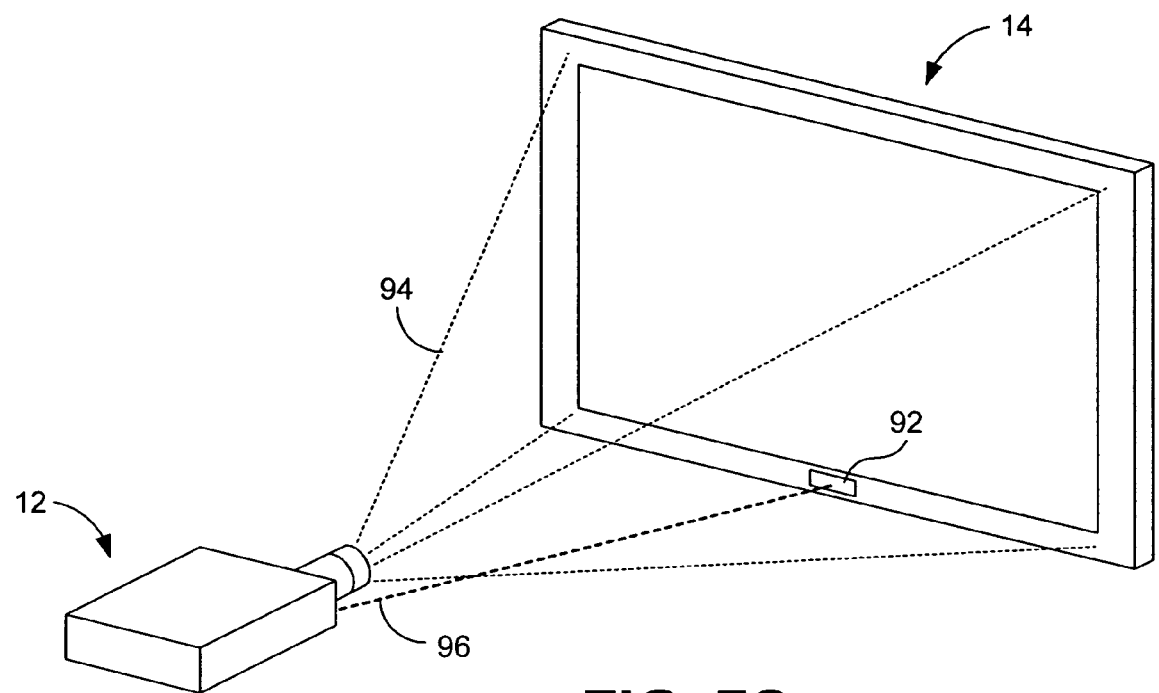
FIG. 7C is schematic representation of a third embodiment of a method for identifying or providing an encryption key to an embodiment of a projection screen.

With reference to FIG. 7C, a code identifying the encryption key or the encryption key itself can be optically transmitted to the projection screen 14. In such a case, the projector 12 transmits a code or the encryption key to the projection screen 14 by projecting encoded image data to an optical sensor 92 that is provided on the projection screen 14. In some embodiments, the encoded image data comprises visible image data 94 that is projected by the light engine 20 (FIG. 1) toward the projection screen 14, for example at the beginning of the viewing session. In other embodiments, the encoded image data comprises invisible image data 96, such as IR data, that is projected by an IR transmitter toward the projection screen optical sensor 92. In either case, the image data is conveyed in a line-of-sight manner, which is unlikely to create crosstalk problems with another display system. Through transmission of the image data, the encoded image data identifies or provides the encryption key to the projection screen 14, and therefore the electrode controller 32.

Figure 7D:
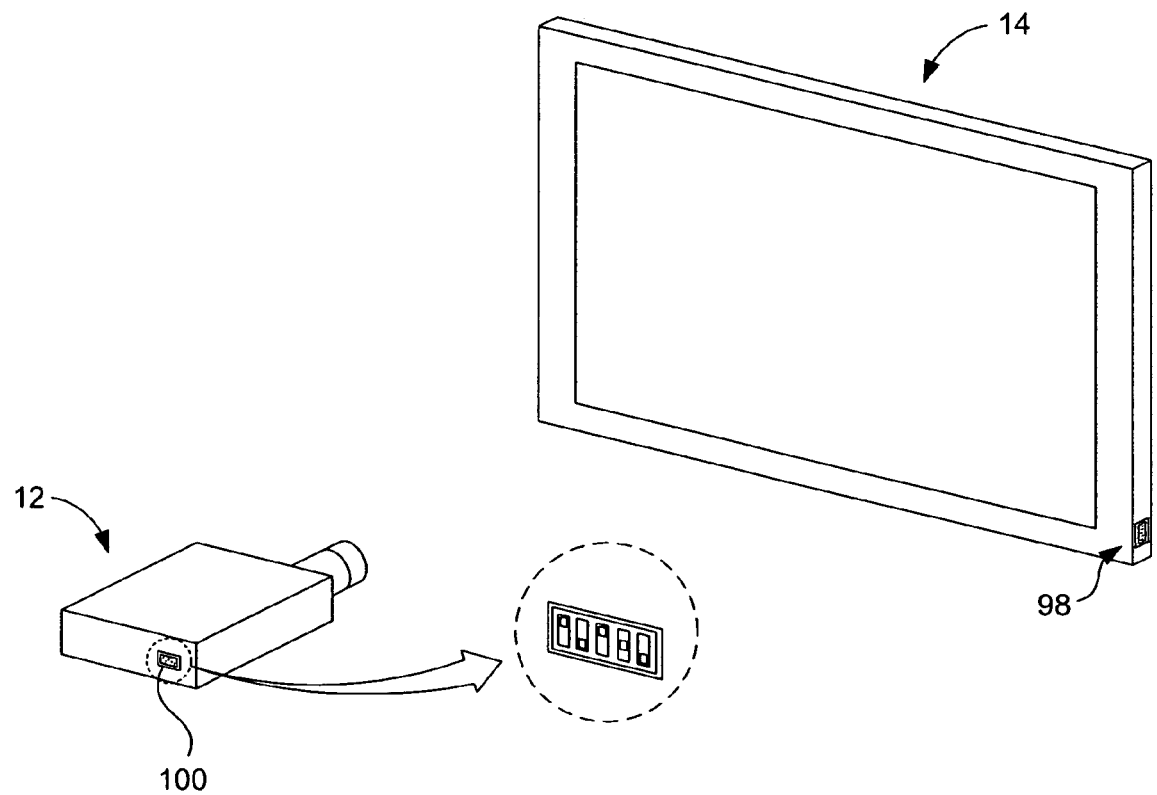
FIG. 7D is schematic representation of a fourth embodiment of a method for identifying or providing an encryption key to an embodiment of a projection screen.

As is shown in FIG. 7D, the encryption key can be identified to the projection screen 14 by setting switches 100 of the projection screen with switches 98 of the projector 12 to set the same encryption key for projection screen 100 and for projector 12. Specifically, the projector 12 and the projection screen 14 can be programmed by setting the switches 98, 100 so as to match, thereby setting the projection projector 12 and the projection screen 14 to use the same encryption key to encrypt and decrypt, respectively.

By way of example, the switches 98, 100 can comprise a set of rocker switches similar to those employed in automatic garage door systems.

Irrespective of the method used to convey the encryption key to the projection screen 14, the screen will have the encryption key that is being or will be used to encrypt the control data that identifies how to control the reflectivity of the pixel elements of the projection screen. Using such encrypted communications, the display system 10 provides security for the projected image data and reduces the opportunity for crosstalk between adjacent display systems.

We claim:

1. A method, comprising:
   generating data to use for adjusting reflectivity of a screen;
   encrypting the data; and
   transmitting encrypted data to the screen.

2. The method of claim 1, wherein the generating data comprises generating control data that indicates how to control reflectivity of display elements of the screen.

3. The method of claim 1, wherein the generating the data comprises analyzing image data to be projected onto the display screen and converting the image data into corresponding pixel element states.

4. The method of claim 3, wherein the generating the data further comprises converting the image data into at least one grayscale image.

5. The method of claim 1, wherein the transmitting the encrypted data comprises wirelessly transmitting the encrypted data.

6. The method of claim 5, wherein wirelessly transmitting the encrypted data comprises transmitting the encrypted data via radio frequency (RF) communication.

7. The method of claim 1, further comprising receiving the encrypted data at the display screen.

8. The method of claim 1, further comprising decrypting the data at the display screen.

9. The method of claim 8, wherein the decrypting the data comprises decrypting the data using an encryption key that was used to encrypt the data.

10. The method of claim 9, wherein the encryption key is a wired equivalent privacy (WEP) key.

11. The method of claim 1, further comprising identifying an encryption key for the screen.

12. The method of claim 11, wherein the identifying the encryption key comprises manually entering a code into the screen that identifies the encryption key to the screen.

13. The method of claim 11, wherein the identifying the encryption key comprises uploading one of a code that identifies the encryption key and the encryption key to a portable storage device, and then downloading the code or encryption key to the screen.

14. The method of claim 11, wherein the identifying the encryption key comprises optically transmitting one of a code that identifies the encryption key and the encryption key from a projector to the screen.

15. The method of claim 11, wherein the identifying the encryption key comprises setting positions of switches on a projector and setting positions of switches on the screen so that the projector and the screen use the encryption key.

16. A system, comprising:
   means for controlling reflectivity of display elements of a display screen; and
   means for identifying an encryption key that can be used to decrypt control data that indicates how to control the reflectivity of the display elements relative to image data that will be displayed on the display screen.

17. The system of claim 16, wherein the means for controlling reflectivity comprise a reflectance processor of a projector and an electrode controller of the display screen.

18. The system of claim 16, wherein the means for identifying an encryption key comprise buttons provided on the display screen that can be used to enter a code that identifies the encryption key.

19. The system of claim 16, wherein the means for identifying an encryption key comprise a portable storage device that can be used to upload a code that identifies the encryption key or the encryption key itself, and to download the code or key to the display device.

20. The system of claim 16, wherein the means for identifying an encryption key comprise an optical transmitter of a projector and an optical receiver of the display screen, wherein a code that identifies the encryption key or the encryption key itself can be optically transmitted from the projector transmitter to the display screen receiver.

21. The system of claim 16, wherein the means for identifying an encryption key comprise switches on a projector and the display device that can be set to select the same encryption key setting on both the projector and the display device.

22. A projector, comprising:
a light engine configured to project an image onto a screen; and
a reflectance processor configured to generate data to adjust the reflectivity of the screen and configured to encrypt the data.

23. The projector of claim 22, wherein the reflectance processor is configured to generate control data that can be used to adjust the reflectivity of display elements of the screen.

24. The projector of claim 22, further comprising a transmitter configured to wirelessly transmit encrypted data to the screen.

25. The projector of claim 22, further comprising a display configured to display a code that identifies an encryption key used to encrypt the data.

26. The projector of claim 22, further comprising a port configured to upload a code that identifies an encryption key used to encrypt the data, or to upload the encryption key, to a portable storage device.

27. The projector of claim 22, further comprising an optical transmitter configured to optically transmit a code that identifies an encryption key used to encrypt the data, or to optically transmit the encryption key, to the screen.

28. The projector of claim 22, further comprising at least one switch configured to control an encryption key that is used to encrypt the control data.

29. A screen, comprising:
a receiver configured to receive encrypted data to adjust the reflectivity of the screen; and
an electrode controller configured to adjust the reflectivity of the screen.

30. The screen of claim 29, wherein the electrode controller is configured to adjust the reflectivity of display elements of the screen.

31. The screen of claim 29, wherein the receiver is a wireless receiver.

32. The screen of claim 29, further comprising buttons configured to facilitate entry of a code that identifies an encryption key used to decrypt the data.

33. The screen of claim 29, further comprising a port configured to download a code that identifies an encryption key used to encrypt the data, or to download the encryption key.

34. The screen of claim 29, further comprising an optical receiver configured to receive a code that identifies an encryption key used to encrypt the control data, or to receive the encryption key itself.

35. The screen of claim 29, further comprising at least one switch configured to control an encryption key that is used to decrypt the data.

36. A system stored on a computer-readable medium, the system comprising:
logic configured to generate data to use for adjusting reflectivity of a screen;
logic configured to encrypt the data;
logic configured to transmit the encrypted data to the screen; and
logic configured to receive and decrypt the encrypted data at the screen.

37. The system of claim 36, wherein the logic configured to transmit the encrypted data is configured to wirelessly transmit the encrypted data.

38. The system of claim 36, wherein the logic configured to decrypt the data is configured to decrypt the control data using an encryption key that was used to encrypt the control data.

39. The system of claim 38, further comprising logic configured to receive the encryption key provided to the screen through one of (i) manual entry by a user of a code into the screen that identifies the encryption key, (ii) downloading of the key to the screen from a portable storage device, optical transmission of key to the screen from a projector, and manual setting of switches by a user on a projector and the screen to set the projector and the screen to the same encryption key setting.

* * * * *